Figure 1:
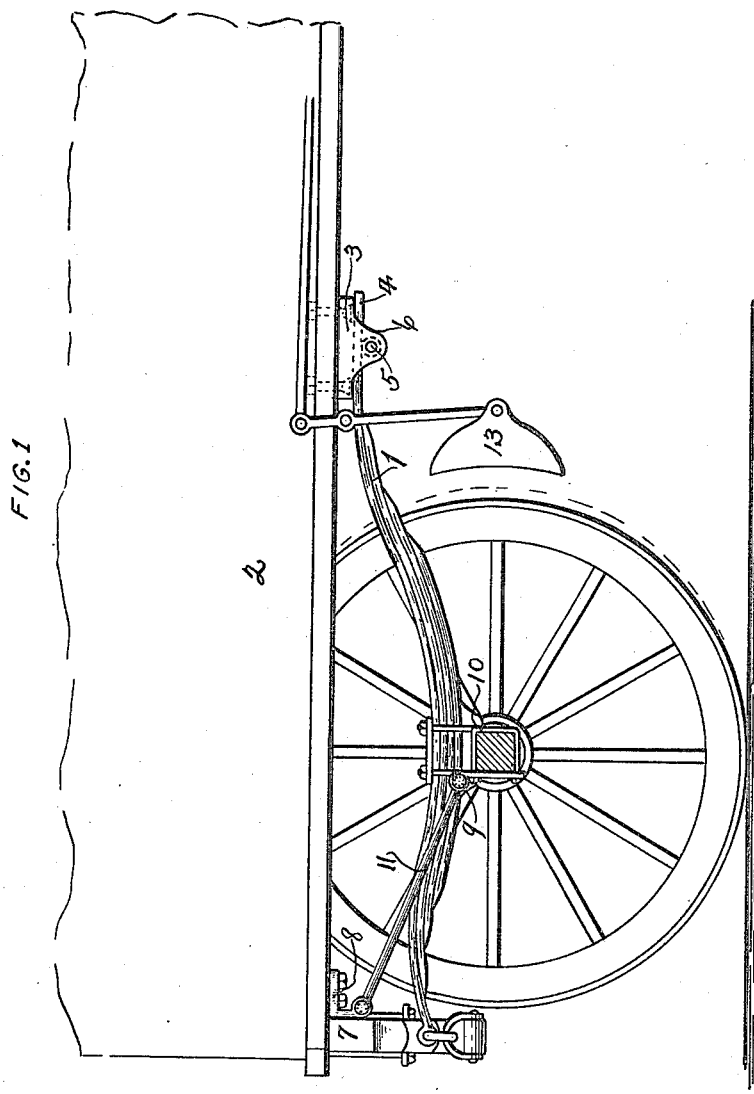

C. H. KRAMER.
VEHICLE.
APPLICATION FILED NOV. 26, 1917.

1,283,214.

Patented Oct. 29, 1918.
2 SHEETS—SHEET 1.

INVENTOR
Charles H. Kramer
BY H. W. Stevenson
Attorney

C. H. KRAMER.
VEHICLE.
APPLICATION FILED NOV. 26, 1917.
1,283,214.
Patented Oct. 29, 1918.
2 SHEETS—SHEET 2.
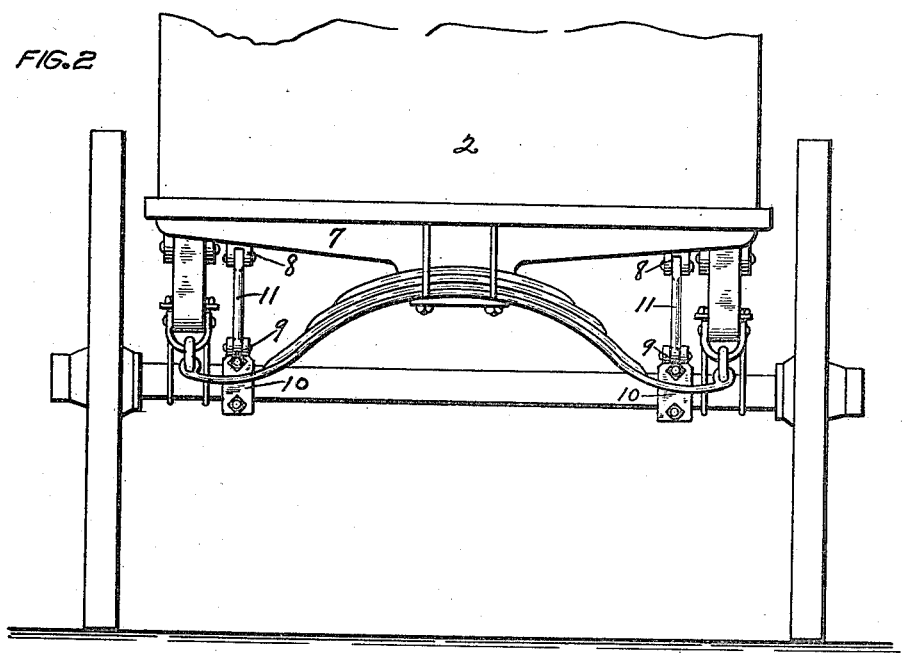
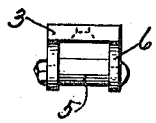
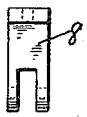
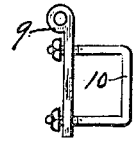
INVENTOR
Charles H. Kramer,
BY H.W. Stevenson
Attorney

UNITED STATES PATENT OFFICE.

CHARLES H. KRAMER, OF PITTSBURGH, PENNSYLVANIA.

VEHICLE.

1,283,214.    Specification of Letters Patent.    Patented Oct. 29, 1918.

Application filed November 26, 1917. Serial No. 203,948.

*To all whom it may concern:*

Be it known that I, CHARLES H. KRAMER, a citizen of the United States, residing at Pittsburgh, in the county of Allegheny and State of Pennsylvania, have invented a certain new and useful Improvement in Vehicles, of which the following is a specification.

My invention pertains to the vehicle art, and is designed primarily as an attachment for animal drawn vehicles, such as wagons, carts, drays, etc., in fact any four wheeled conveyance that carries a load, the said attachment acting to assist in the propulsion of the vehicle when carrying a load by exerting a forward thrust against the rear axle and wheels, instead of the usual drag, or back pressure prevalent in the present styles of vehicles.

A further advantage residing in my device is that it will serve to keep the rear wheels tight against the brake blocks, when the latter members are set, the tendency being to create a closer relationship between the wheel and brake block, thus obviating the necessity for applying additional pieces or lining members to the said block during the natural frictional wear on these latter mentioned members.

In the accompanying drawings I have illustrated one preferred embodiment of my invention, which however is susceptible of modification in its detail form of construction, without departing from the original idea and intention. I reserve the right to make any such necessary changes as further experimenting and reduction to practice may dictate, and that will confine my invention within the scope of the claims.

Referring then to said drawings Figure 1 shows a side elevation of the rear portion of a vehicle, partly in section, with one of my attachments in its operative position thereon; Fig. 2 is the rear end of a vehicle showing the relative positions of a pair of my attachment members with respect to the body and rear axle; Fig. 3 is a detail of one of the forwardly positioned housings for the side spring; Fig. 4 is a knuckle or stirrup portion of my device for attachment to the spring block; Fig. 5 is a detail of another knuckle portion of my device for attachment to the rear axle; and Fig. 6 shows a modified construction of the connecting rod or link portion of the device, provided with a turn buckle.

In the present construction of vehicles, designed for hauling heavy loads, such as wagons, trucks, carts, etc., the forwardly positioned ends of both side springs, here designated by the reference numeral 1, are rigidly secured to the under side of the body portion 2, while in the present invention, and as an essential feature of my device, the forward ends of said side springs are adjustable longitudinally, being made to slide freely in the supporting hangers 3, a detail of one of these members being shown in Fig. 3, the upper disposed leaf 4 of said spring being confined in said hanger by a removable under disposed bolt 5, carried by the apertured depending lugs 6. The rearwardly disposed ends of these side springs are immovably held in a manner common to the present form of vehicle construction.

Rigidly secured to the under side of the spring block 7, at a point adjacent both ends thereof, are the bifurcated and apertured stirrups 8, a detail of one of these members being shown in Fig. 4, while also rigidly secured to the rear axle of the vehicle, in direct alinement with said stirrups, are the knuckle elements 9, held in position by U-shaped straps 10 that embrace said axle.

Connecting these aforesaid members 8 and 9 are the rods or links 11, their end portions being provided with an eye and pivotally united in their respective housings. These said rods 11 may be in one integral piece, or, as a modification thereof, may be in two threaded sections with an intermediate turn buckle 12, as illustrated in Fig. 6.

The depressed condition of the vehicle body, when carrying a load, will have a tendency to exert a forward shoving function against the rear axle through the medium of the rods 11, thus pushing the rear wheels toward the brake block 13, and incidentally aiding in the proplusion of the vehicle, the side springs 1, by reason of having their forward end adjustable, readily responding in unison with this shoving movement, and relaxing to their normal attitude upon removal of the load and consequent raising of the body of the vehicle.

Owing to the pivotal union residing at both ends of these connecting rods 11 they are free to adjust themselves to variable angles, incidental to the depressed condition of the vehicle body, without buckling or becoming distorted, their particular function being to exert a more or less forward pressure against the rear axle with the vehicle loaded.

In the present construction of vehicles of this class there is always a tendency, when loaded, for the rear axle and wheels to move away from instead of toward the brake block, which necessitates adding numerous lining pieces to the block to compensate for this additional space and natural wear and tear.

With the use of my attachment the above mentioned expediency becomes unnecessary owing to the fact that the rear wheels will always be advanced toward the brake block when set, thus keeping these two members in close frictional contact.

What I claim as my invention, and desire to secure by Letters Patent, is:

1. In a vehicle, the combination with the body and rear axle, of a spring block secured to the rear end of said body, a transverse spring secured to said spring block, side springs secured to said axle, the ends of said transverse spring being connnected to the rear ends of said side springs, and the front ends of said side springs being slidably engaged with said body, and thrust members connected to said spring block and rear axle.

2. In a vehicle, the combination with the body and rear axle, of a spring block secured to the rear end of said body, a transverse spring secured to said spring block, side springs secured to said axle, the ends of said transverse spring being connected to the rear ends of said side springs and the front ends of said side springs being slidably engaged with said body, and thrust members pivotally connected to said spring block and rear axle.

3. In a vehicle, the combination with the body and rear axle, of a spring block secured to the rear end of said body, a transverse spring secured to said spring block, side springs secured to said axle, the ends of said transverse spring being connected to the rear ends of said side springs, and the front ends of said side springs being slidably arranged in suitable housings secured to said body, and thrust members pivotally connected to said spring block and rear axle.

In testimony whereof I hereunto affix my hand at Pittsburgh, Penna., this 24th day of November, 1917.

CHARLES H. KRAMER.

Copies of this patent may be obtained for five cents each, by addressing the "Commissioner of Patents, Washington, D. C."